US009071162B2

(12) United States Patent  
Yamada

(10) Patent No.: US 9,071,162 B2  
(45) Date of Patent: Jun. 30, 2015

(54) AC-AC CONVERTER WITH REDUCED INDUCTIVE LOSS AND SWITCHING LOSS

(75) Inventor: Ryuji Yamada, Hachioji (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 93 days.

(21) Appl. No.: 13/817,142

(22) PCT Filed: Nov. 16, 2011

(86) PCT No.: PCT/JP2011/076452  
§ 371 (c)(1),  
(2), (4) Date: Apr. 8, 2013

(87) PCT Pub. No.: WO2012/067167  
PCT Pub. Date: May 24, 2012

(65) Prior Publication Data  
US 2013/0235625 A1   Sep. 12, 2013

(30) Foreign Application Priority Data

Nov. 17, 2010   (JP) .................................. 2010-257017

(51) Int. Cl.  
H02M 5/458   (2006.01)  
H02J 9/06   (2006.01)  
H02M 1/00   (2007.01)

(52) U.S. Cl.  
CPC ........ *H02M 5/4585* (2013.01); *H02J 2009/063* (2013.01); *H02M 2001/0048* (2013.01)

(58) Field of Classification Search  
CPC ......... H02M 5/42; H02M 5/45; H02M 5/453; H02M 5/458; H02M 5/4585

USPC ............ 363/21.04, 21.06, 34, 35, 36, 37, 123  
See application file for complete search history.

(56) References Cited

U.S. PATENT DOCUMENTS

| 6,084,785 | A | 7/2000 | Kunisada et al. |
| 7,595,613 | B2 | 9/2009 | Thompson et al. |
| 2006/0103365 | A1 | 5/2006 | Ben-Yaacov |
| 2009/0201706 | A1* | 8/2009 | Zacharias et al. ............. 363/123 |
| 2011/0025236 | A1* | 2/2011 | Takizawa ..................... 318/139 |

FOREIGN PATENT DOCUMENTS

| JP | 63-314176 A | 12/1988 |
| JP | 07-337036 A | 12/1995 |

(Continued)

OTHER PUBLICATIONS

Machine Translation of JP 2006-296098.*

*Primary Examiner* — Fred E Finch, III  
*Assistant Examiner* — Ishrat Jamali  
(74) *Attorney, Agent, or Firm* — Rabin & Berdo, P.C.

(57) ABSTRACT

An AC-AC converter includes a first semiconductor switch series circuit, a second semiconductor switch series circuit, and a capacitor series circuit are connected in parallel. A first inductor is connected between one end of an alternating current input and a series connection point of the first semiconductor switch series circuit. A bidirectional switch is connected between the one end of the alternating current input and a series connection point of the second semiconductor switch series circuit. A second inductor is connected between the series connection point of the second semiconductor switch series circuit and one end of an alternating current output. A series connection point of the capacitor series circuit is connected to the other end of the alternating current input and the other end of the alternating current output.

10 Claims, 11 Drawing Sheets

(56) References Cited

FOREIGN PATENT DOCUMENTS

| | | |
|---|---|---|
| JP | 08-152928 | 6/1996 |
| JP | 08-217417 A | 8/1996 |
| JP | 10-075581 A | 3/1998 |
| JP | 3301714 | 7/2002 |
| JP | 2006-296098 A | 10/2006 |

* cited by examiner

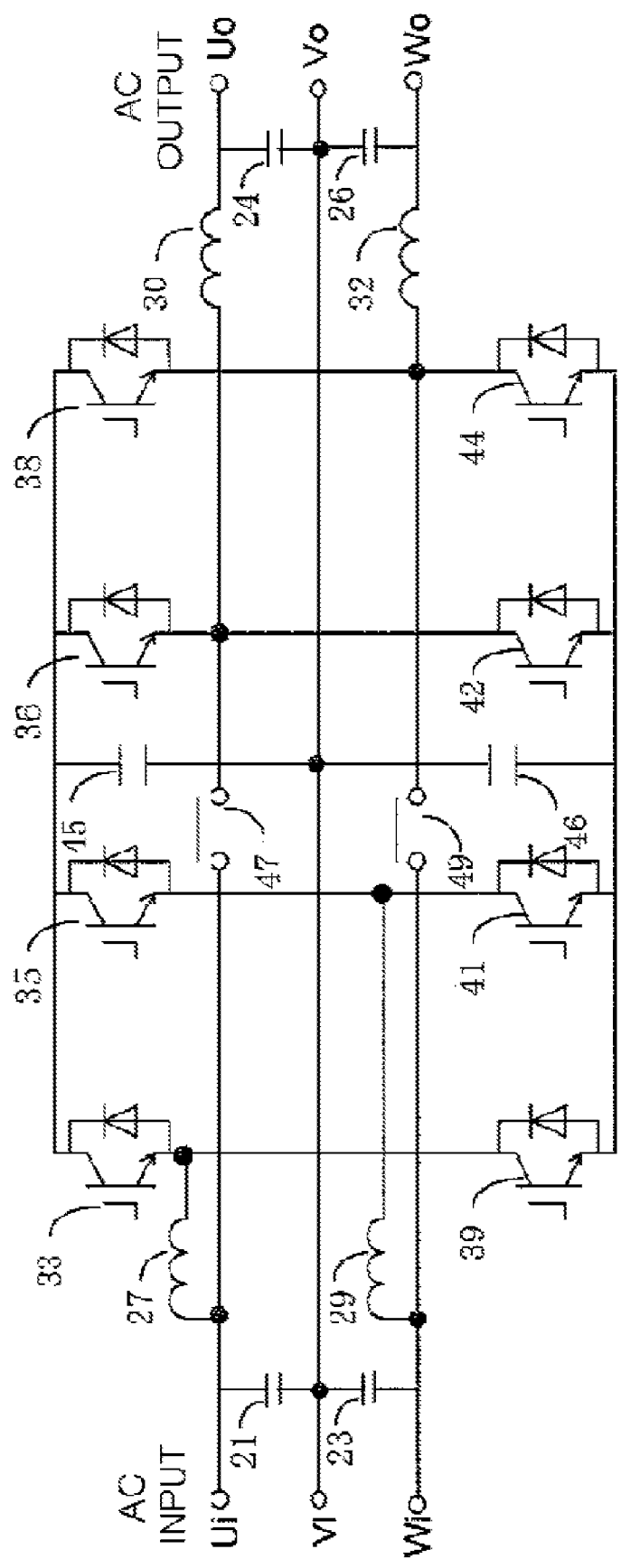

AC-AC CONVERTER WITH REDUCED INDUCTIVE LOSS AND SWITCHING LOSS

TECHNICAL FIELD

The present invention relates to improving the efficiency of an uninterruptible power system that compensates for fluctuation of an alternating current voltage or for a power interruption, thus supplying a stable voltage to a load.

BACKGROUND ART

FIG. 1 is a diagram showing an example of a circuit configuration of an AC-AC converter described in PLT 1 shown below. In FIGS. 1, 1 and 2 are filter capacitors, 3 and 4 are inductors, 5 to 8 are IGBTs (Insulated Gate Bipolar Transistors) (semiconductor switches that can control the turning on and off of a forward current, and that are always in a state of conduction with respect to reverse current), and 9 and 10 are smoothing capacitors. A circuit configuration wherein the inductor 3 is connected between a series connection point of the IGBTs 5 and 6 of a parallel connection circuit of a series connection circuit of the IGBTs 5 and 6 and a series connection circuit of the capacitors 9 and 10 and one end of an alternating current input, and the other end of the alternating current input is connected to a series connection point of the capacitors 9 and 10, is well known as a high power factor rectifier circuit using a half bridge configuration, and is caused to function as a step-up AC-DC conversion circuit wherein a direct current voltage higher than the peak value of an alternating current input voltage is obtained by switching of the IGBTs 5 and 6.

Also, a circuit configuration wherein the inductor 4 is connected between a series connection point of the IGBTs 7 and 8 of a parallel connection circuit of a series connection circuit of the IGBTs 7 and 8 and the series connection circuit of the capacitors 9 and 10 and one end of an alternating current output, the other end of the alternating current output is connected to the series connection point of the capacitors 9 and 10, and the capacitor 2 is connected between alternating current outputs U and V, is well known as a reverse conversion circuit (inverter) using a half bridge configuration. The circuit is caused to function as a DC-AC conversion circuit wherein a sinusoidal alternating current voltage is obtained from a direct current voltage by switching of the IGBTs 7 and 8.

The AC-AC converter shown in FIG. 1 is used in an application that compensates for voltage fluctuation in an alternating current input, thus supplying a fixed voltage to a load, in an application that supplies uninterrupted power to a load by supplying direct current power to the capacitors 9 and 10 from unshown storage means when an alternating current input is interrupted, and the like.

A bidirectional switch 11 is connected between the series connection point of the IGBTs 5 and 6 and the series connection point of the IGBTs 7 and 8, but firstly, a description will be given hereafter of operations when no bidirectional switch 11 is connected.

An example of an operation when the polarity of an alternating current input current 11 in the high power factor rectifier circuit is positive is as follows.

The current path when the IGBT 6 is turned on is a path from one end Ui of the input terminal through the inductor 3, IGBT 6, and capacitor 10 to the other end Vi of the input terminal, and energy is accumulated in the inductor 3. The current path when the IGBT 6 is turned off is a path from the one end Ui of the input terminal through the inductor 3, the anti-parallel connected diode of the IGBT 5, and the capacitor 9 to the other end Vi of the input terminal, and the energy in the inductor 3 is discharged to the capacitor 9. In this operation, one semiconductor device exists in the current path.

Also, an example of an operation when the polarity of an alternating current output current 12 in the reverse conversion circuit (inverter) is positive is as follows. The current path when the IGBT 7 is turned on is from the capacitor 9 through the IGBT 7, inductor 4, one end U of the alternating current output, the load (not shown), and the other end V of the alternating current output to the capacitor 9. The current path when the IGBT 7 is turned off is from the capacitor 10 through the anti-parallel connected diode of the IGBT 8, the inductor 4, the one end U of the alternating current output, the load (not shown), and the other end V of the alternating current output to the capacitor 10. In this operation, one semiconductor device exists in the current path. The heretofore described operations are such that the current passes through two semiconductor devices until reaching the alternating current output from the alternating current input.

Next, a description will be given hereafter of operations when the bidirectional switch 11 is connected between the series connection point of the IGBTs 5 and 6 and the series connection point of the IGBTs 7 and 8. A first operation is an operation whereby the bidirectional switch 11 is turned on when the IGBTs 5 and 7 are simultaneously turned on, or when the IGBTs 6 and 8 are simultaneously turned on, causing the current to bypass. Furthermore, a second operation is an operation whereby, when fluctuation of the input voltage is within a range tolerated by the load, the switching operation of the IGBTs 5 to 8 is stopped, so that the IGBTs 5 to 8 are in an off-state, and the bidirectional switch 11 is continuously in an on-state. In the first and second operations, as the bidirectional switch 11 is the only semiconductor element in the current path from the alternating current input to the alternating current output, loss is reduced.

When the alternating current input voltage is a voltage within the tolerance value (hereafter called a specified value) of the load connected to the alternating current output, the alternating current input voltage being sent directly to the alternating current output is a method generally implemented in a standby type power supply such as an uninterruptible power system. Meanwhile, the circuit shown in FIG. 1 is such that, when the alternating current input voltage deviates from the specified value, it is possible to restore normal operation delayed by a time (normally a few tens of microseconds) in the region of the switching cycle of the semiconductor element. As disturbance during this period is removed by a filter formed of the capacitors 1 and 2 and inductors 3 and 4, there is an advantage in that, unlike with a standby type power supply, no disturbance occurs in the output.

The examples shown in FIG. 2 are known as examples of a configuration of a bidirectional switch. Also, an example of a configuration of a bidirectional switch different from the bidirectional switches shown in FIG. 2 is shown in FIG. 3, but this will be referred to later. In FIG. 2(a), two reverse blocking IGBTs RB1 and RB2, which have a breakdown voltage with respect to voltage with reverse polarity equivalent to that with respect to forward polarity, are connected in anti-parallel. In FIG. 2(b), circuits provided with reverse breakdown voltage by diodes D1 and D2 being respectively connected in series to normal IGBTs Q1 and Q2, which do not have reverse breakdown voltage, are further connected in anti-parallel. In FIG. 2(c), the IGBT Q1, to which the diode D1 is connected in anti-parallel, and the IGBT Q2, to which the diode D2 is connected in anti-parallel, are connected in anti-series.
PLT 1: JP-A-2006-296098

DISCLOSURE OF INVENTION

The method of the heretofore known technology shown in PLT 1 is such that, although it is possible to reduce conduction loss in the first operation, switching loss is equivalent to that in the combination of the high power factor rectifier and inverter in which no bidirectional switch 11 is provided. Also, although the current passes through two reactors from the input until reaching the output in both the first and second operations, it is not possible to reduce loss occurring here.

Consequently, in order to solve the heretofore described kinds of problem, an object of the invention is to provide an AC-AC converter such that it is possible to reduce switching loss, and furthermore, such that a reduction in size can be achieved by reducing loss in the inductors.

In order to achieve the object of the invention, a first aspect of the invention is such that an AC-AC converter is configured of a forward converter that converts alternating current to direct current using a semiconductor switch switching operation and a reverse converter that converts direct current to alternating current using a semiconductor switch switching operation, and a direct current output of the forward converter and a direct current input of the reverse converter are connected, wherein a first semiconductor switch series circuit wherein semiconductor switches, to each of which a diode is connected in anti-parallel, are connected in series, a second semiconductor switch series circuit wherein semiconductor switches, to each of which a diode is connected in anti-parallel, are connected in series, and a capacitor series circuit wherein capacitors are connected in series are connected in parallel, a first inductor is connected between one end of an alternating current input and a series connection point inside the first semiconductor switch series circuit, a bidirectional switch is connected between the one end of the alternating current input and a series connection point inside the second semiconductor switch series circuit, a second inductor is connected between the series connection point inside the second semiconductor switch series circuit and one end of an alternating current output, and a series connection point inside the capacitor series circuit is connected to each of the other end of the alternating current input and the other end of the alternating current output.

A second aspect of the invention is such that the first aspect of the invention includes a first control mode whereby, in accordance with the voltage value of the alternating current input, all the semiconductor switches of the first semiconductor switch series circuit and second semiconductor switch series circuit are turned off, and the bidirectional switch is turned on.

A third aspect of the invention is such that the first aspect of the invention includes a second control mode whereby, in accordance with the voltage value of the alternating current input, the semiconductor switches of the second semiconductor switch series circuit and the bidirectional switch are turned on and off alternately.

A fourth aspect of the invention is such that the first aspect of the invention includes a third control mode whereby, in accordance with the voltage value of the alternating current input, the bidirectional switch is turned off, and the semiconductor switches of the second semiconductor switch series circuit are turned on and off.

A fifth aspect of the invention is such as to use devices such that the voltage when the bidirectional switch device in the first to fourth aspects of the invention is in an on-state is lower than the voltage when the devices of the first and second semiconductor switch series circuits are in an on-state.

A sixth aspect of the invention is such that an AC-AC converter is configured of a forward converter that converts alternating current to direct current using a semiconductor switch switching operation and a reverse converter that converts direct current to alternating current using a semiconductor switch switching operation, and a direct current output of the forward converter and a direct current input of the reverse converter are connected, wherein a first semiconductor switch series circuit wherein semiconductor switches, to each of which a diode is connected in anti-parallel, are connected in series, a second semiconductor switch series circuit wherein semiconductor switches, to each of which a diode is connected in anti-parallel, are connected in series, and a capacitor series circuit wherein capacitors are connected in series are connected in parallel, a first inductor is connected between one end of an alternating current input and a series connection point inside the first semiconductor switch series circuit, a first bidirectional switch is connected between the one end of the alternating current input and a series connection point inside the second semiconductor switch series circuit, a second bidirectional switch is connected between a series connection point inside the capacitor series circuit and the series connection point inside the second semiconductor switch series circuit, a second inductor is connected between the series connection point inside the second semiconductor switch series circuit and one end of an alternating current output, and the series connection point inside the capacitor series circuit is connected to each of the other end of the alternating current input and the other end of the alternating current output.

A seventh aspect of the invention includes a control mode whereby the first bidirectional switch and second bidirectional switch in the sixth aspect of the invention are turned on and off alternately, thus obtaining an alternating current output voltage lower than an alternating current input voltage.

As the invention includes a bidirectional switch for connecting an alternating current input directly to the output of a reverse converter (before a filter inductor) when the alternating current input voltage is within a specified range, it is possible to keep the inductor loss of the rectifier sufficiently small when the input voltage is within the specified range. Also, in addition to this, it is possible to reduce switching loss more than in heretofore known circuits when carrying out a compensation action. Furthermore, it is possible to reduce the size of the inductors of both the rectifier and inverter.

BRIEF DESCRIPTION OF DRAWINGS

FIG. 11 is a circuit diagram showing a fourth working example of the invention.

DESCRIPTION OF EMBODIMENTS

Figure 1:
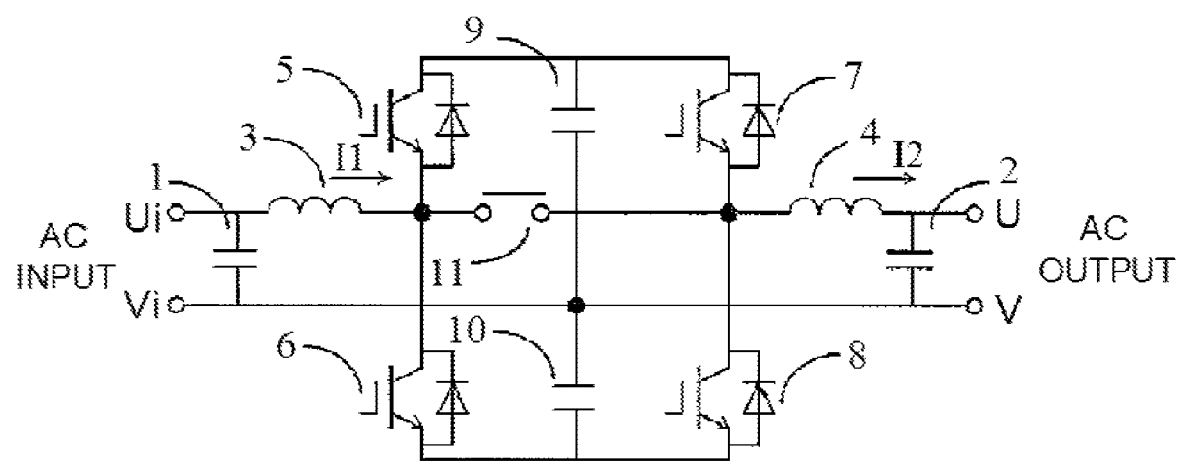
FIG. 1 is a circuit diagram showing a configuration of a heretofore known AC-AC converter.

Hereafter, a description will be given, while referring to the drawings, of an embodiment of the invention.

To give an outline of an operation of the invention, when an alternating current input voltage is within a specified range, the alternating current input is sent via a bidirectional switch directly to an alternating current output (before an output inductor), while when the alternating current input voltage is outside the specified range, the bidirectional switch and a semiconductor switch of a reverse conversion circuit are turned on and off alternately, thus stepping the alternating current input voltage up or down into the specified range.

Example 1

Figure 4:
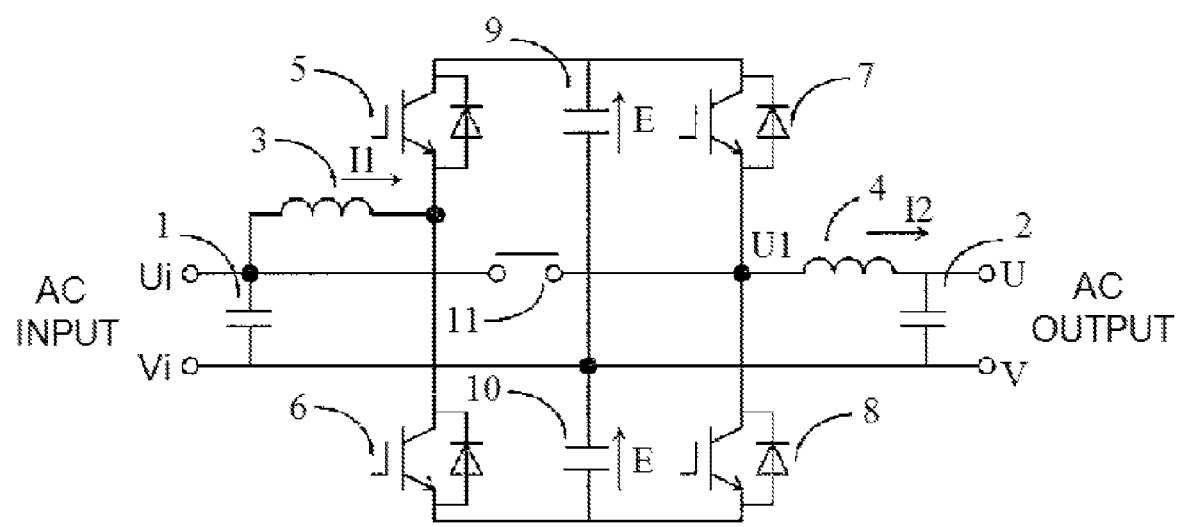
FIG. 4 is a circuit diagram showing a first working example of the invention.
Figure 5:
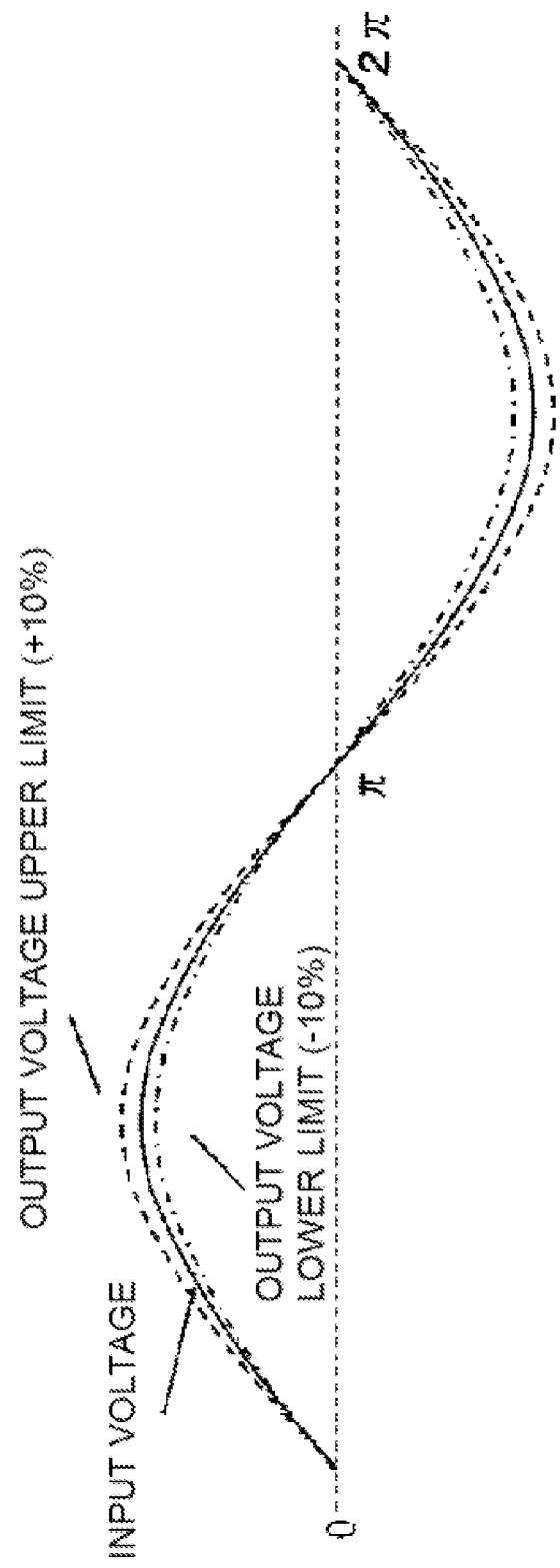
FIG. 5 is a diagram showing alternating current input and alternating current output waveform examples.
Figure 6:
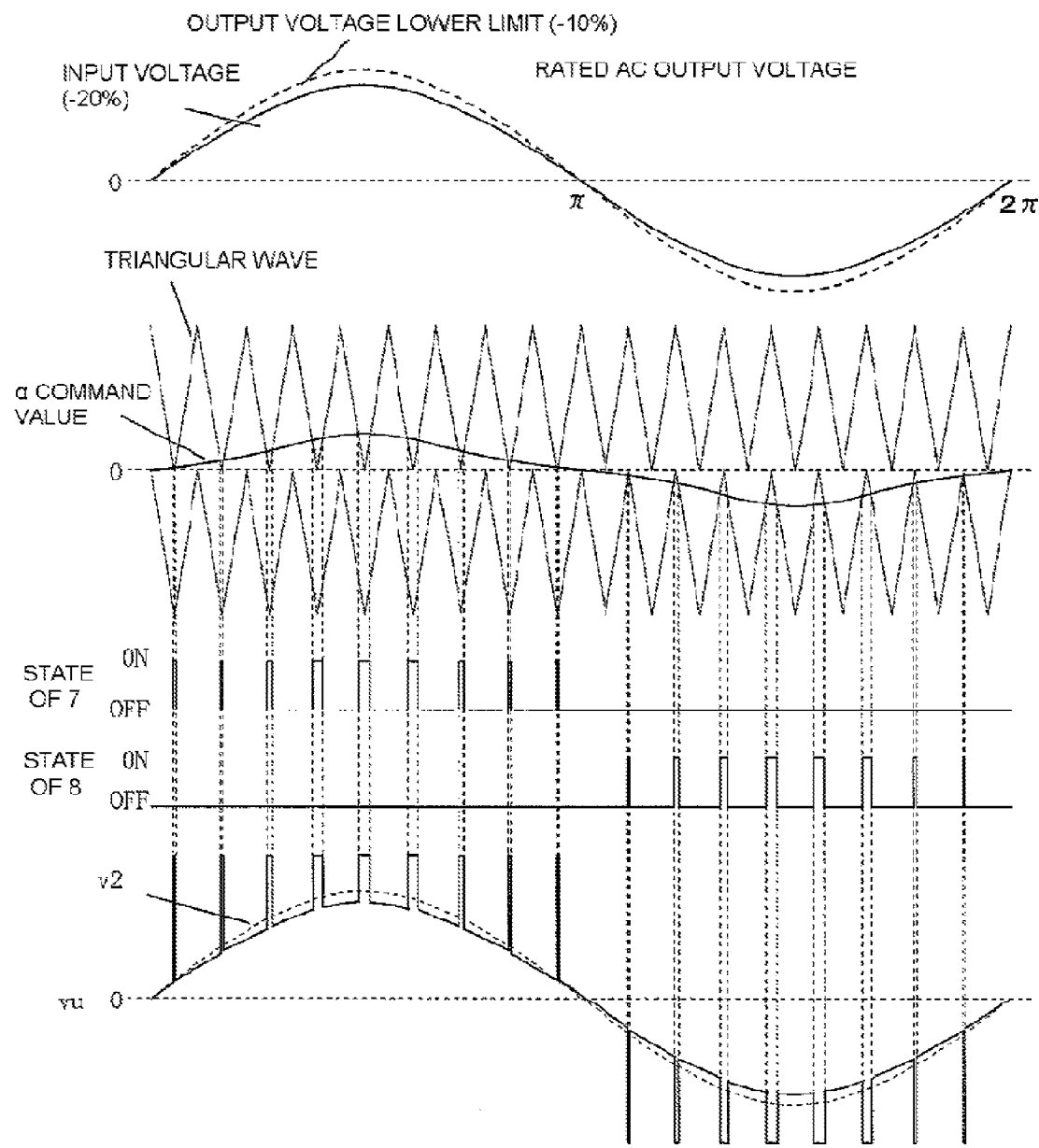
FIG. 6 is a diagram showing waveform examples at a time of a step-up operation of FIG. 4.
Figure 7:
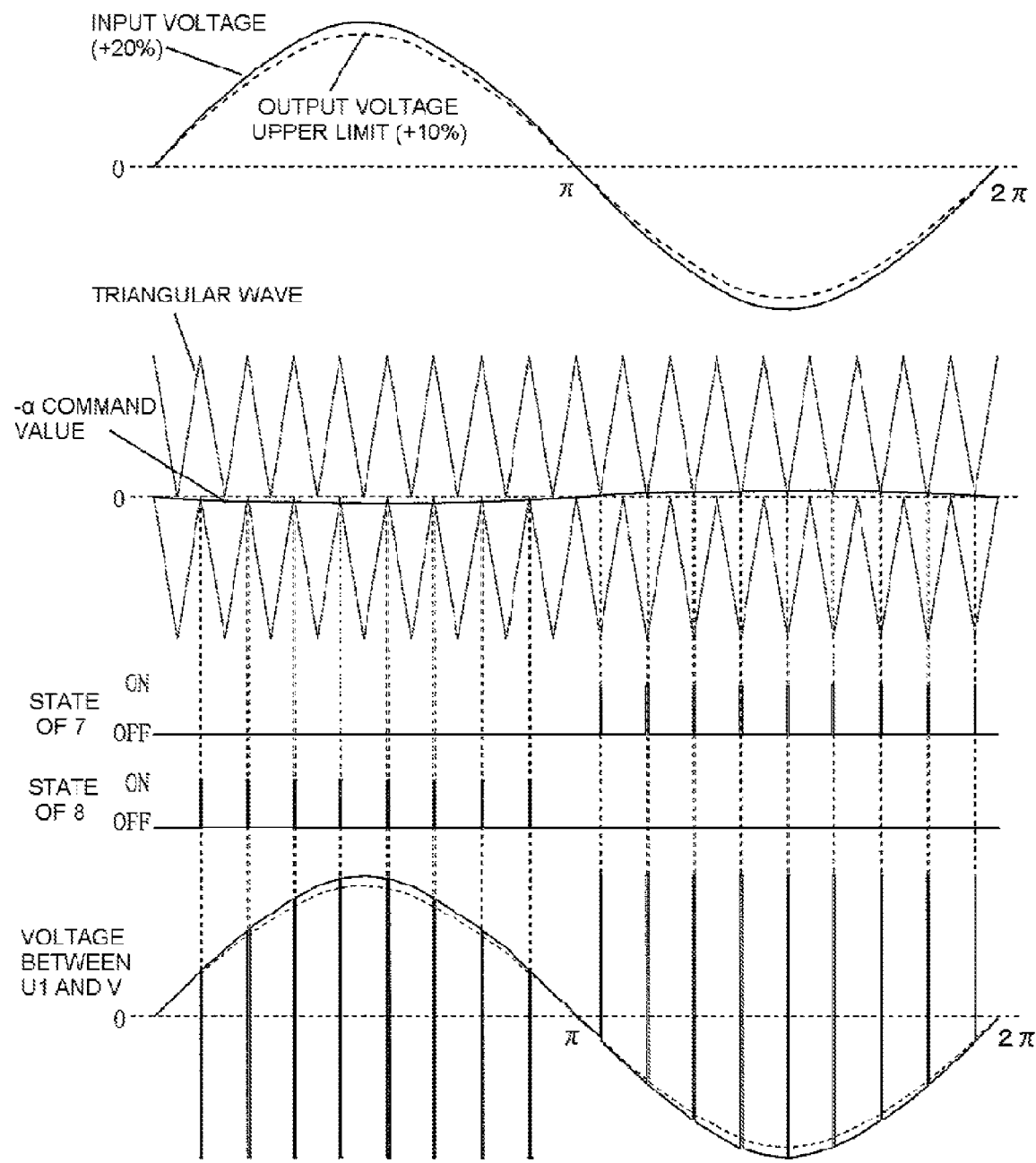
FIG. 7 is a diagram showing waveform examples at a time of a step-down operation of FIG. 4.

FIG. 4 is a circuit diagram showing a first working example of the invention, while FIG. 5 to FIG. 7 are diagrams showing operation waveform examples of the first working example.

An AC-DC conversion/DC-AC conversion circuit configured of semiconductors in FIG. 4 is configured by a first IGBT series circuit wherein IGBTs 5 and 6, to each of which a diode is connected in anti-parallel, are connected in series, a second IGBT series circuit wherein IGBTs 7 and 8, to each of which a diode is connected in anti-parallel, are connected in series, and a capacitor series circuit wherein capacitors 9 and 10 are connected in series being connected in parallel.

A inductor 3 is connected between one end Ui of an alternating current input and a series connection point inside the first IGBT series circuit, a bidirectional switch 11 is connected between the one end Ui of the alternating current input and a series connection point inside the second IGBT series circuit, and a inductor 4 is connected between the series connection point inside the second IGBT series circuit and one end U of an alternating current output. A series connection point inside the capacitor series circuit is connected to each of the other end Vi of the alternating current input and the other end V of the alternating current output. A filter capacitor 1 is connected between the alternating current inputs Ui and Vi, while a filter capacitor 2 is connected between the alternating current outputs U and V.

An operation in this kind of configuration will be described based on FIG. 5 to FIG. 7.

As operating modes, there are an operating mode 1 when an alternating current input voltage is within the tolerance range of a load connected to the alternating current output, an operating mode 2 when the alternating current input voltage is lower than the tolerance range of the load, and an operating mode 3 when the alternating current input voltage is higher than the tolerance range of the load.

Firstly, a description will be given of the operating mode 1. In the great majority of load devices, a certain amount, for example ±10%, of input power source voltage fluctuation is tolerated. Consequently, when the input voltage is within this range, as shown in, for example, FIG. 5, the device does not need a control operation for keeping the output voltage constant. In this case, with the bidirectional switch 11 in an on-state and the IGBTs 7 and 8 in an off-state, the alternating current input is output directly. At this time, no switching loss occurs in the bidirectional switch 11 or IGBTs 7 and 8. The IGBTs 5 and 6 carry out a rectifying operation for maintaining the voltage of the capacitors 9 and 10 at a predetermined value E in preparation for a compensation operation, to be described hereafter, but provided that the capacitors 9 and 10 are once charged, only power equivalent to the leakage current needs to be supplied, meaning that the passing current is extremely small, and loss thereof can be ignored. As loss accompanying the passing current of the reactor 3 is also equally slight, loss is smaller than in a heretofore known example. Hereafter, this operating state will be called a direct mode.

Next, a description will be given of the operating mode 2. FIG. 6 is a diagram showing an operation waveform when the input voltage reaches, for example, −20%, which is below the specified value. In FIG. 6, the IGBT 7 and bidirectional switch 11 are turned on and off alternately when the output voltage polarity is positive, while the IGBT 8 and bidirectional switch 11 are turned on and off alternately when the output voltage polarity is negative. When the IGBTs 7 and 8 are turned on, a ratio α is determined by the following.

An alternating current input voltage instantaneous value v1 is taken to be $$v1 = V1 \cdot \sin\theta \quad \text{Equation (1).}$$

Herein, θ is any time phase (electrical angle).

Meanwhile, a desired alternating current output voltage instantaneous value v2 is taken to be $$v2 = V2 \cdot \sin\theta \quad \text{Equation (2).}$$

For example, as the voltage between U1 and V is E when the IGBT 7 is in an on-state, and v1 when the bidirectional switch 11 is in an on-state, when the output voltage polarity is positive, a one-switching cycle average value vu is obtained from Equation (3) below.

$$vu = \alpha E + (1-\alpha) \cdot v1 \quad \text{Equation (3).}$$

Taking a voltage drop caused by the inductor 4 here to be small, and the alternating current output voltage to be largely equivalent to vu, it is possible to maintain v2 at a desired value provided that α of each time is set from Equation (1), Equation (2), and Equation (3) so as to be $$V2 \cdot \sin\theta = \alpha E + (1-\alpha) \cdot V1 \cdot \sin\theta \quad \text{Equation (4).}$$

Therefore, $$\alpha = (V2 - V1)\sin\theta / (E - V1 \cdot \sin\theta) \quad \text{Equation (5).}$$

FIG. 6 shows a method whereby the turning on and off of the IGBTs 7 and 8 is determined from an α command value obtained from Equation (5), using a triangular wave comparison method well known to those skilled in the art. Although omitted from the drawing, it is taken that when the IGBTs 7 and 8 are in an off-state, the bidirectional switch 11 is in an on-state. A normal inverter and the circuit shown in PLT 1, wherein the IGBTs 7 and 8 are turned on and off alternately, are such that the voltage between U1 and V changes between +E and −E, meaning that the range of a semiconductor switch voltage change accompanying the switching is 2E. Meanwhile, in the example of FIG. 6, the voltage change range is E−|V1·sin θ|, which is constantly smaller than that mentioned above. As switching loss is largely proportional to the voltage change range, switching loss decreases. Hereafter, this operating state will be called a step-up mode.

Next, a description will be given of the operating mode 3. FIG. 7 is a diagram showing an operation waveform when the input voltage reaches, for example, +20%, which is above the specified value. In FIG. 7, the IGBT 8 and bidirectional switch 11 are turned on and off alternately when the output voltage polarity is positive, while the IGBT 7 and bidirectional switch 11 are turned on and off alternately when the output voltage polarity is negative. When the IGBTs 7 and 8 are turned on, the ratio α is determined by the following.

For example, as the voltage between U1 and V is −E when the IGBT 8 is in an on-state, and v1 when the bidirectional switch 11 is in an on-state, when the output voltage polarity is positive, the one-switching cycle average value vu is obtained from Equation (6) below.

$$vu = -\alpha E + (1-\alpha) \cdot v1 \qquad \text{Equation (6).}$$

Taking a voltage drop caused by the inductor 4 here to be small, and the alternating current output voltage to be largely equivalent to vu, it is possible to maintain v2 at a desired value provided that a of each time is set from Equation (1), Equation (2), and Equation (6) so as to be $$V2 \cdot \sin\theta = -\alpha E + (1-\alpha) \cdot V1 \cdot \sin\theta \qquad \text{Equation (7).}$$

Therefore, $$\alpha = (V1 - V2)\sin\theta / (E + V1 \cdot \sin\theta) \qquad \text{Equation (8).}$$

FIG. 7 shows a method whereby the turning on and off of the IGBTs 7 and 8 is determined from an α command value obtained from Equation (8), using a triangular wave comparison method well known to those skilled in the art, as in FIG. 6. Herein, in order to unify the size relationship between the signal wave and triangular wave and the on-off state of the IGBTs 7 and 8 with those of the heretofore described step-up mode, −α is used for the signal wave. Also, as in the step-up mode, it is taken that when the IGBTs 7 and 8 are in an off-state, the bidirectional switch 11 is in an on-state. In this case, the range of the semiconductor switch voltage change accompanying the switching is E+|V1·sin θ|, which is larger than in the step-up mode, but as the range is smaller than the change range 2E of a normal inverter and the circuit shown in PLT 1, switching loss decreases, as in the step-up mode. Hereafter, this state will be called a step-down mode.

As heretofore described, the inverter supplies one portion of the power from a direct current circuit in the step-up mode, while the inverter absorbs one portion of the power in the direct current circuit in the step-down mode. The power is supplied or returned by the rectifier. Because of this, it is no longer necessary for the rectifier to allow 100% of the load power to pass, and it is possible for the power rating of the inductor 3 and IGBTs 5 and 6, which are the parts configuring the rectifier, to be considerably lower than that of the inductor 4 and IGBTs 7 and 8, which are the parts configuring the inverter.

Furthermore, the inductor 4 of the inverter can also be reduced in size. The reason is as follows. As opposed to a normal inverter, the voltage change range is extremely small in FIG. 6, and the pulse width is extremely small in FIG. 7. This is because, as reactor ripple current is proportional to voltage change range×pulse width and inversely proportional to inductance, loss (mainly iron loss) due to the ripple current decreases when the inductance is the same, while it is possible to reduce the inductance value when the ripple current is the same.

When using the system as an uninterruptible power system, an electrical storage device is connected to the direct current portion, and in the event that the input deviates from a range in which compensation is possible, the bidirectional switch 11 is turned off, and an operation the same as that of a normal inverter is carried out with the IGBTs 7 and 8. In this case, the ripple current of the inductor 4 of the inverter is larger than normal, and the accompanying loss also increases. However, while the interruption compensation time of an uninterruptible power system is generally within ten minutes, the thermal time constant of the inductor is from several tens of minutes to several hours. Consequently, even when designing the inductor to be reduced in size, the problem of excessive temperature is easily avoided.

Loss in the device is smallest in the direct mode, followed in order by the step-up mode and step-down mode. When the load power is constant, the total power amount of the loss is affected by the ratio of each mode. Although the loss reduction advantage is small in the step-down mode, it is rare in actual operation that only the step-down mode continues.

In the device, in the same way as in PLT 1, a shift from the direct mode to the step-up or step-down mode is carried out in a short time within one switching cycle, and also, as an LC filter exists between the switching point and the load, it is possible to prevent disturbance due to a mode switch from appearing in the output.

Example 2

Figure 8:
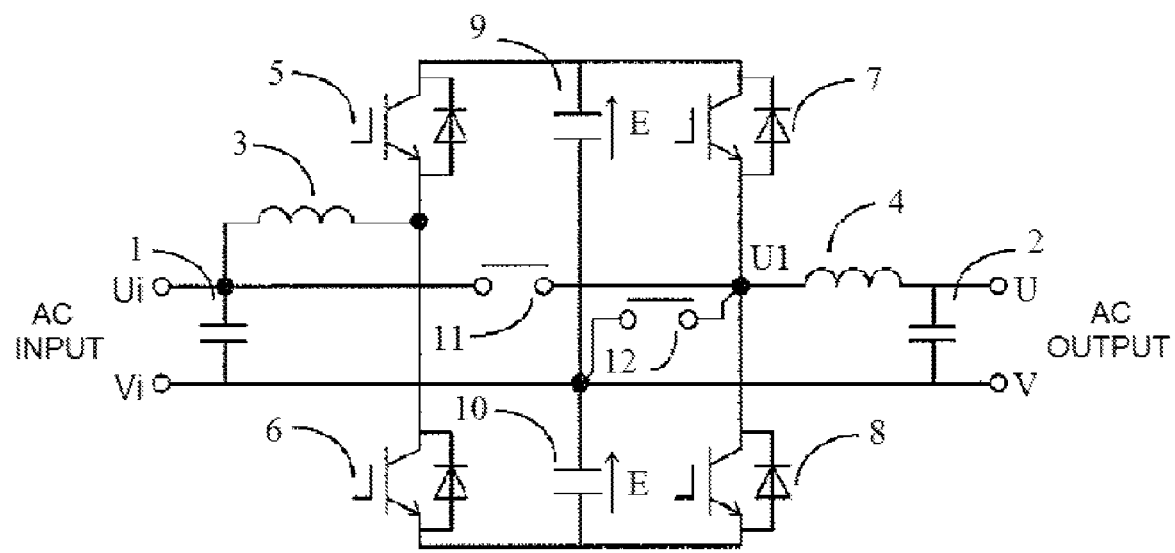
FIG. 8 is a circuit diagram showing a second working example of the invention.

FIG. 8 is a circuit diagram showing a second working example of the invention. Portions the same as in FIG. 4 are given the same reference signs, and a description thereof is omitted.

Figure 9:
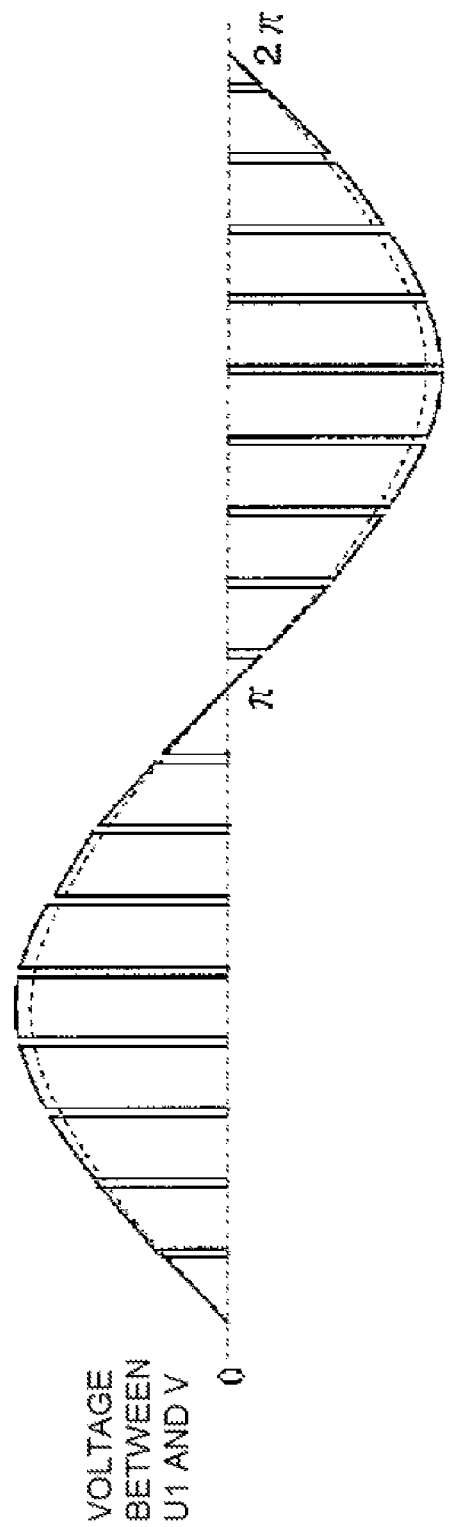
FIG. 9 is a diagram showing an operation waveform example of FIG. 8.

Working Example 2, having an object of reducing switching loss in the step-down mode, is such that a bidirectional semiconductor switch 12 is added between U1 and V. An operating principle thereof is shown in FIG. 9. In the step-down mode, the bidirectional switches 11 and 12 are turned on and off alternately. This configuration is an alternating current chopper circuit wherein the voltage between U1 and V becomes equivalent to the input voltage when the bidirectional switch 11 is turned on, and 0V when the bidirectional switch 12 is turned on. For example, when taking the ratio when the bidirectional switch 11 is turned on to be a constant value of 0.9, regardless of phase, the output voltage becomes 0.9 times the input voltage. This circuit is such that the voltage change range is equivalent to the input voltage instantaneous value.

In Working Examples 1 and 2, the bidirectional switch 11 constantly has conduction in the direct mode, and the conduction rate of the bidirectional switch 11 is highest in the step-up mode or step-down mode too. By reducing only the forward voltage drop of the bidirectional switch 11, it is possible to achieve an improvement in efficiency at minimum cost.

Figure 2A:
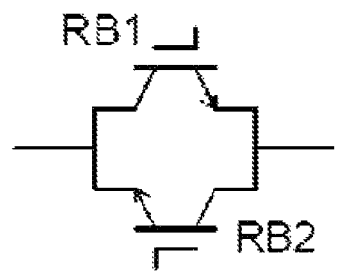
FIG. 2 is a diagram showing examples of a configuration of a heretofore known bidirectional switch.
Figure 2B:
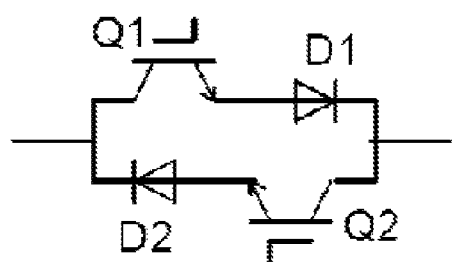
Figure 2C:
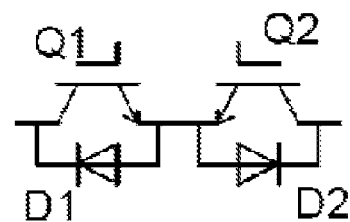
Figure 3:
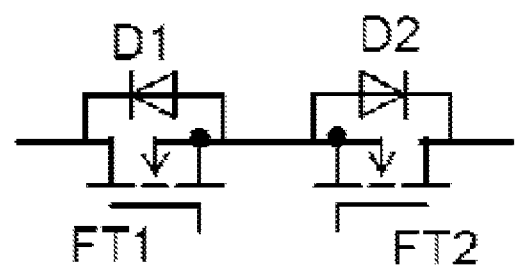
FIG. 3 is a diagram showing another example of a configuration of a heretofore known bidirectional switch.

To give a description of a specific example of reducing only the forward voltage drop of a bidirectional switch, the bidirectional switch shown in, for example, FIG. 3 has a configuration different from that shown in FIG. 2 in that, although the connection condition is the same as that in FIG. 2(c), a MOSFET (Metal Oxide Semiconductor Field Effect Transistor) is used as a switching element. As a MOSFET has resistance characteristics such that current and forward voltage drop are proportional, unlike an IGBT, it is theoretically possible to bring the forward voltage drop nearer to zero, without limit, by increasing the number in parallel. Also, as there is also conduction in the reverse direction when voltage is applied to the gate, it is possible under certain conditions to reduce the forward voltage drop farther than with a parallel diode. In particular, in recent years, MOSFETs using Sic (Silicon Carbide) are starting to be put to practical use, and a considerable reduction in the forward voltage drop is expected. When this MOSFET using Sic (Silicon carbide) is used with the configuration of FIG. 3, the forward voltage drop decreases further, and it is possible to reduce conduction loss. Even when a MOSFET using Sic is more expensive than a heretofore known MOSFET, it is used only in the bidirectional switch portion for the heretofore described reasons, meaning that it is possible to obtain a large loss reduction advantage with a minimum cost increase.

Example 3

Figure 10:
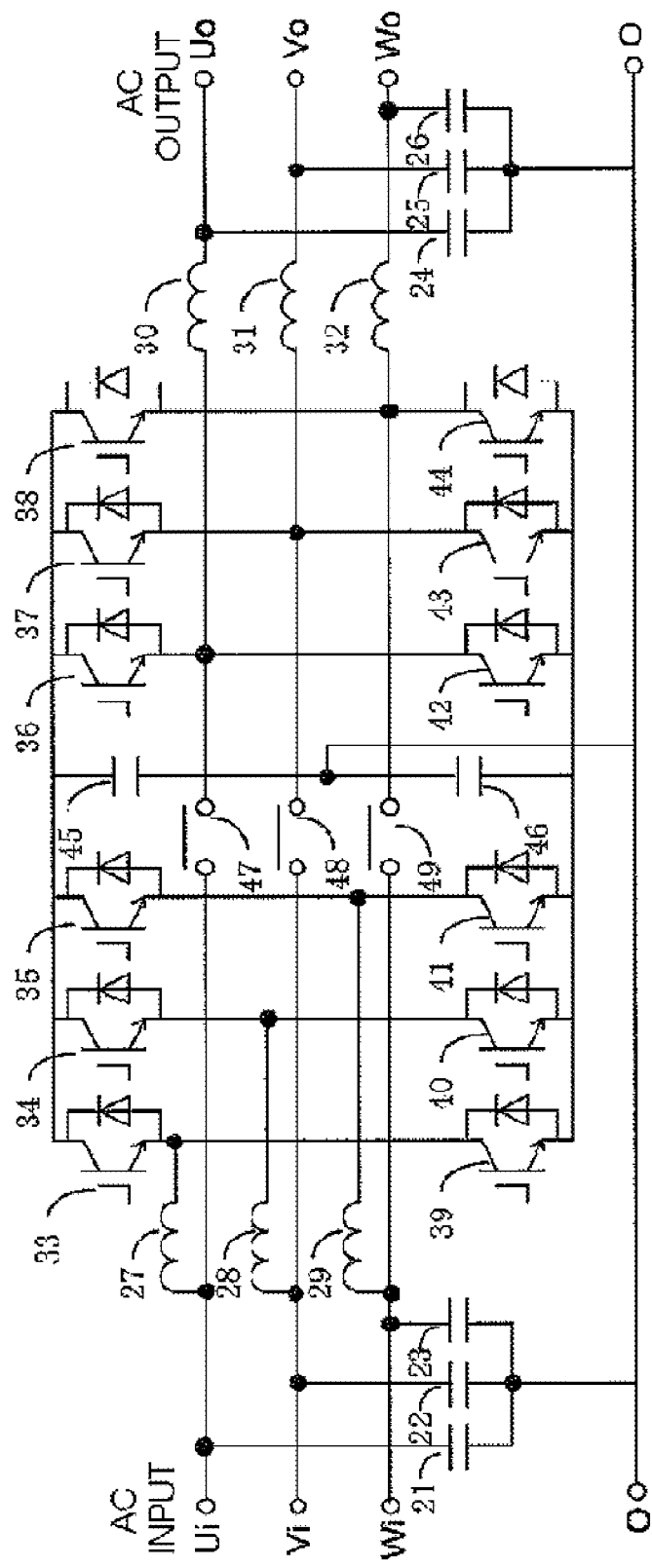
FIG. 10 is a circuit diagram showing a third working example of the invention.

FIG. 10, being a circuit diagram showing a third working example of the invention, shows an example of application to a three-phase circuit. This three-phase circuit is an example wherein the circuit of the first working example illustrated in FIG. 4 is configured using three circuits. The series connection point inside the capacitor series circuit of the circuit of FIG. 4 is taken as a neutral point potential of the three-phase circuit, and shared by the three circuits. The switching circuit is such that both a forward conversion circuit portion and reverse conversion circuit portion are connected in parallel to a capacitor series circuit (45 and 46) for each of the three circuits. The forward conversion circuit portion is such that a series circuit of IGBTs 33 and 39, a series circuit of IGBTs 34 and 40, and a series circuit of IGBTs 35 and 41 are connected in parallel to the series circuit of the capacitors 45 and 46. The reverse conversion circuit portion is such that a series circuit of IGBTs 36 and 42, a series circuit of IGBTs 37 and 43, and a series circuit of IGBTs 38 and 44 are connected in parallel to the series circuit of the capacitors 45 and 46. The connection positions of inductors 27 to 32 and the connection positions of bidirectional switches 47 to 49 are the same as in Working Example 1. As the operation is the same as in Working Example 1, a description thereof will be omitted.

Example 4

FIG. 11 is a circuit diagram showing a fourth working example of the invention. It is a working example of when a three-phase circuit is configured using two of the circuit of the first working example illustrated in FIG. 4. It is a so-called V-connection conversion circuit wherein the series connection point inside the capacitor series circuit of the circuit of FIG. 4 is connected to one line of both the three-phase input and output. The switching circuit is such that both a forward conversion circuit portion and reverse conversion circuit portion are connected in parallel to the capacitor series circuit for each of the two circuits. The forward conversion circuit portion is such that the series circuit of IGBTs 33 and 39 and the series circuit of IGBTs 35 and 41 are connected in parallel to the series circuit of the capacitors 45 and 46. The reverse conversion circuit portion is such that the series circuit of IGBTs 36 and 42 and the series circuit of IGBTs 38 and 44 are connected in parallel to the series circuit of the capacitors 45 and 46. The connection positions of the reactors 27, 29, 30, and 32 and the connection positions of the bidirectional switches 47 and 49 are the same as in Working Example 1. As the operation is the same as in Working Example 1, a description thereof will be omitted.

In the heretofore described working examples, examples have been shown wherein IGBTs are applied as the switching elements, but the switching elements, not being limited to IGBTs, can also be realized as MOSFETs, bipolar elements, or the like.

INDUSTRIAL APPLICABILITY

The invention is a configuration that converts alternating current input voltage into a stabilized alternating current output voltage using a forward conversion circuit and reverse conversion circuit, and can be applied to an uninterruptible power system (UPS: Uninterruptible Power System), an alternating current stabilized power supply (AVR: Automatic Voltage Regulator), an alternating current power regulator (APR: AC Power Regulator), and the like.

The invention claimed is:

1. An AC-AC converter for receiving power from first and second AC input conductors and supplying power to first and second output conductors, comprising:
    a first semiconductor switch series circuit wherein first semiconductor switches, to each of which a diode is connected in anti-parallel, are connected in series;
    a second semiconductor switch series circuit wherein second semiconductor switches, to each of which a diode is connected in anti-parallel, are connected in series,
    a capacitor series circuit wherein capacitors are connected in series, the capacitor series circuit being connected in parallel with the first and second semiconductor switch series circuits;
    a first inductor connected between the first AC input conductor and a series connection point inside the first semiconductor switch series circuit;
    a bidirectional switch connected directly to the first AC input conductor and directly to a series connection point inside the second semiconductor switch series circuit; and
    a second inductor connected between the series connection point inside the second semiconductor switch series circuit and the first AC output conductor,
    wherein a series connection point inside the capacitor series circuit is connected to the second AC input conductor and to the second AC output conductor.

2. The AC-AC converter according to claim 1, wherein the AC-AC converter is operable in a first control mode in which, in accordance with the voltage value of an alternating current input supplied to the first and second AC input conductors, all the semiconductor switches of the first semiconductor switch series circuit and second semiconductor switch series circuit are turned off, and the bidirectional switch is turned on.

3. The AC-AC converter according to claim 2, wherein a voltage when the bidirectional switch element is in an on-state is lower than the voltage when the semiconductor switches of the first and second semiconductor switch series circuits are in an on-state.

4. The AC-AC converter according to claim 1, wherein the AC-AC converter is operable in a second control mode in which, in accordance with the voltage value of an alternating current input supplied to the first and second AC input conductors, the semiconductor switches of the second semiconductor switch series circuit and the bidirectional switch are turned on and off alternately.

5. The AC-AC converter according to claim 4, wherein a voltage when the bidirectional switch element is in an on-state is lower than the voltage when the semiconductor switches of the first and second semiconductor switch series circuits are in an on-state.

6. The AC-AC converter according to claim 1, wherein the AC-AC converter is operable in a third control mode in which, in accordance with the voltage value of an alternating current input supplied to the first and second AC input conductors, the bidirectional switch is turned off, and the semiconductor switches of the second semiconductor switch series circuit are turned on and off.

7. The AC-AC converter according to claim 6, wherein a voltage when the bidirectional switch element is in an on-state is lower than the voltage when the semiconductor switches of the first and second semiconductor switch series circuits are in an on-state.

8. The AC-AC converter according to claim 1, wherein a voltage when the bidirectional switch element is in an on-state is lower than the voltage when the semiconductor switches of the first and second semiconductor switch series circuits are in an on-state.

9. An AC-AC converter for receiving power from first and second AC input conductors and supplying power to first and second output conductors, comprising:

a first semiconductor switch series circuit wherein first semiconductor switches, to each of which a diode is connected in anti-parallel, are connected in series;

a second semiconductor switch series circuit wherein second semiconductor switches, to each of which a diode is connected in anti-parallel, are connected in series;

a capacitor series circuit wherein capacitors are connected in series, the capacitor series circuit being connected in parallel with the first and second semiconductor switch series circuits;

a first inductor connected between the first AC input conductor and a series connection point inside the first semiconductor switch series circuit;

a first bidirectional switch connected directly to the first AC input conductor and directly to a series connection point inside the second semiconductor switch series circuit;

a second bidirectional switch connected between a series connection point inside the capacitor series circuit and the series connection point inside the second semiconductor switch series circuit; and a second inductor connected between the series connection point inside the second semiconductor switch series circuit and the first AC output conductor, wherein the series connection point inside the capacitor series circuit is connected to the second AC input conductor and to the second AC output conductor.

10. The AC-AC converter according to claim 9, wherein the AC-AC converter is operable in a control mode in which the first bidirectional switch and second bidirectional switch are turned on and off alternately, thus obtaining an alternating current output voltage lower than an alternating current input voltage.

* * * * *